(12) United States Patent
Nakamura (10) Patent No.: US 11,648,765 B2
(45) Date of Patent: May 16, 2023

(54) SEALING METHOD

(71) Applicant: Huawei Technologies Co., Ltd., Shenzhen (CN)

(72) Inventor: Yutaka Nakamura, Yokohama (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 310 days.

(21) Appl. No.: 16/756,541

(22) PCT Filed: Oct. 17, 2017

(86) PCT No.: PCT/CN2017/106590
§ 371 (c)(1),
(2) Date: Apr. 16, 2020

(87) PCT Pub. No.: WO2019/075645
PCT Pub. Date: Apr. 25, 2019

(65) Prior Publication Data
US 2020/0290336 A1    Sep. 17, 2020

(51) Int. Cl.
| | |
|---|---|
| *B29C 65/00* | (2006.01) |
| *B32B 37/12* | (2006.01) |
| *B32B 7/14* | (2006.01) |
| *B32B 37/00* | (2006.01) |
| *B32B 38/00* | (2006.01) |
| *G06F 3/041* | (2006.01) |
| *B29C 65/14* | (2006.01) |

(Continued)

(52) U.S. Cl.
CPC ............ *B32B 37/1292* (2013.01); *B32B 7/14* (2013.01); *B32B 37/0076* (2013.01); *B32B 38/0008* (2013.01); *G06F 3/041* (2013.01); *B29C 65/02* (2013.01); *B29C 65/1406* (2013.01); *B29C 65/40* (2013.01); *B29C 65/483* (2013.01); *B29C 66/4326* (2013.01); *B32B 2457/208* (2013.01)

(58) Field of Classification Search
CPC ..... B29C 65/02; B29C 65/1406; B29C 65/40; B29C 65/483; B29C 66/4326; B32B 37/0076
See application file for complete search history.

(56) References Cited

U.S. PATENT DOCUMENTS

| | | | |
|---|---|---|---|
| 6,048,433 A | 4/2000 | Maesaka et al. | |
| 7,554,121 B2 * | 6/2009 | Hirakata | H01L 51/0545 257/79 |

(Continued)

FOREIGN PATENT DOCUMENTS

| | | |
|---|---|---|
| CN | 1184379 A | 6/1998 |
| CN | 102792218 A | 11/2012 |

(Continued)

OTHER PUBLICATIONS

Translation WO 2015/181918 (Year: 2015).*

*Primary Examiner* — Philip C Tucker
*Assistant Examiner* — Nickolas R Harm
(74) *Attorney, Agent, or Firm* — Conley Rose, P.C.

(57) ABSTRACT

A sealing method includes dispensing an adhesive on an edge surface of a first part, performing a first activation for hardening the adhesive to a predetermined hardness, performing a second activation for triggering appearance of adhesion strength of the adhesive, assembling the first part and a second part, and pressing the first part and the second part against each other.

19 Claims, 6 Drawing Sheets

(51) Int. Cl.
*B29C 65/48* (2006.01)
*B29C 65/02* (2006.01)
*B29C 65/40* (2006.01)

(56) References Cited

U.S. PATENT DOCUMENTS

| | | | | |
|---|---|---|---|---|
| 9,674,965 | B1* | 6/2017 | Salinger | H05K 5/0086 |
| 9,715,301 | B2* | 7/2017 | Kuboyama | G06F 3/0488 |
| 2004/0163768 | A1* | 8/2004 | Nowicki | B31B 50/624 |
| | | | | 427/207.1 |
| 2005/0046622 | A1* | 3/2005 | Nakanishi | G06F 3/045 |
| | | | | 345/173 |
| 2006/0204698 | A1 | 9/2006 | Miller et al. | |
| 2007/0139949 | A1* | 6/2007 | Tanda | F21K 9/235 |
| | | | | 257/E33.059 |
| 2008/0054785 | A1* | 3/2008 | Hayashi | B29C 66/133 |
| | | | | 156/273.3 |
| 2009/0314536 | A1* | 12/2009 | Takizawa | H05K 3/305 |
| | | | | 257/690 |
| 2010/0245706 | A1* | 9/2010 | Oohira | G02F 1/133308 |
| | | | | 349/58 |
| 2012/0092812 | A1* | 4/2012 | Lewis | G06F 1/1626 |
| | | | | 361/679.01 |
| 2012/0325402 | A1 | 12/2012 | Suwa et al. | |
| 2013/0056153 | A1 | 3/2013 | Czaplicki | |
| 2013/0314648 | A1* | 11/2013 | Rappoport | G02F 1/133502 |
| | | | | 349/137 |
| 2014/0210991 | A1 | 7/2014 | Koo | |
| 2014/0246148 | A1* | 9/2014 | Liu | C09J 5/00 |
| | | | | 156/60 |
| 2014/0264426 | A1* | 9/2014 | Yamashita | H01L 33/54 |
| | | | | 174/541 |
| 2014/0362305 | A1* | 12/2014 | Yao | G06F 3/041 |
| | | | | 349/12 |
| 2015/0014141 | A1 | 1/2015 | Rao et al. | |
| 2015/0036285 | A1* | 2/2015 | Lu | H04R 1/023 |
| | | | | 361/679.55 |
| 2015/0153829 | A1* | 6/2015 | Shiraishi | G06F 3/016 |
| | | | | 345/173 |
| 2015/0268492 | A1* | 9/2015 | Hino | G02F 1/1336 |
| | | | | 445/24 |
| 2016/0050762 | A1* | 2/2016 | Cyman, Jr. | B32B 38/145 |
| | | | | 156/578 |
| 2016/0101609 | A1* | 4/2016 | Liu | G02F 1/133308 |
| | | | | 156/291 |
| 2017/0031525 | A1* | 2/2017 | Wilson | G06F 1/1656 |
| 2017/0104049 | A1* | 4/2017 | Nakamura | G02F 1/133345 |
| 2017/0199607 | A1* | 7/2017 | Nakano | G02F 1/13338 |
| 2017/0308192 | A1* | 10/2017 | Ogura | G06F 3/04164 |
| 2018/0213646 | A1* | 7/2018 | Benkley, III | H05K 1/183 |
| 2019/0049769 | A1* | 2/2019 | Sugiyama | G02F 1/133308 |

FOREIGN PATENT DOCUMENTS

| | | | |
|---|---|---|---|
| CN | 102947403 A | 2/2013 | |
| CN | 103786340 A | 5/2014 | |
| CN | 103972425 A | 8/2014 | |
| CN | 205408329 U | 7/2016 | |
| CN | 106502464 A | 3/2017 | |
| WO | WO-2015181918 A1 * | 12/2015 | B05C 11/10 |
| WO | WO-2016131269 A1 * | 8/2016 | |
| WO | WO-2017029800 A1 * | 2/2017 | G06F 3/01 |
| WO | WO-2018161424 A1 * | 9/2018 | H04M 1/02 |

* cited by examiner

SEALING METHOD

CROSS-REFERENCE TO RELATED APPLICATIONS

This application is a U.S. National Stage of International Patent Application No. PCT/CN2017/106590 filed on Oct. 17, 2017, which is hereby incorporated by reference in its entirety.

TECHNICAL FIELD

The present invention relates to a sealing method, and in particular, to a sealing method for sealing a boundary between a housing and a touch panel of a smart phone.

BACKGROUND

Conventionally, for bonding a housing and a touch panel of a smart phone together and sealing a boundary between them, a double-sided tape is used mainly because of its stability. However, an adhesive may be used for bonding them together and sealing a narrow edge of a housing due to its adhesion strength. Generally, adhesion strength of an adhesive is stronger than that of a double-sided tape.

However, an adhesive has some disadvantages. One of them is that pressure is needed to be applied to bond. When pressure is applied, an adhesive layer may be flattened and its adequate thickness needed for adhesion may not be kept. Accordingly, spacers are provided on an edge surface of a housing.

Figure 1:
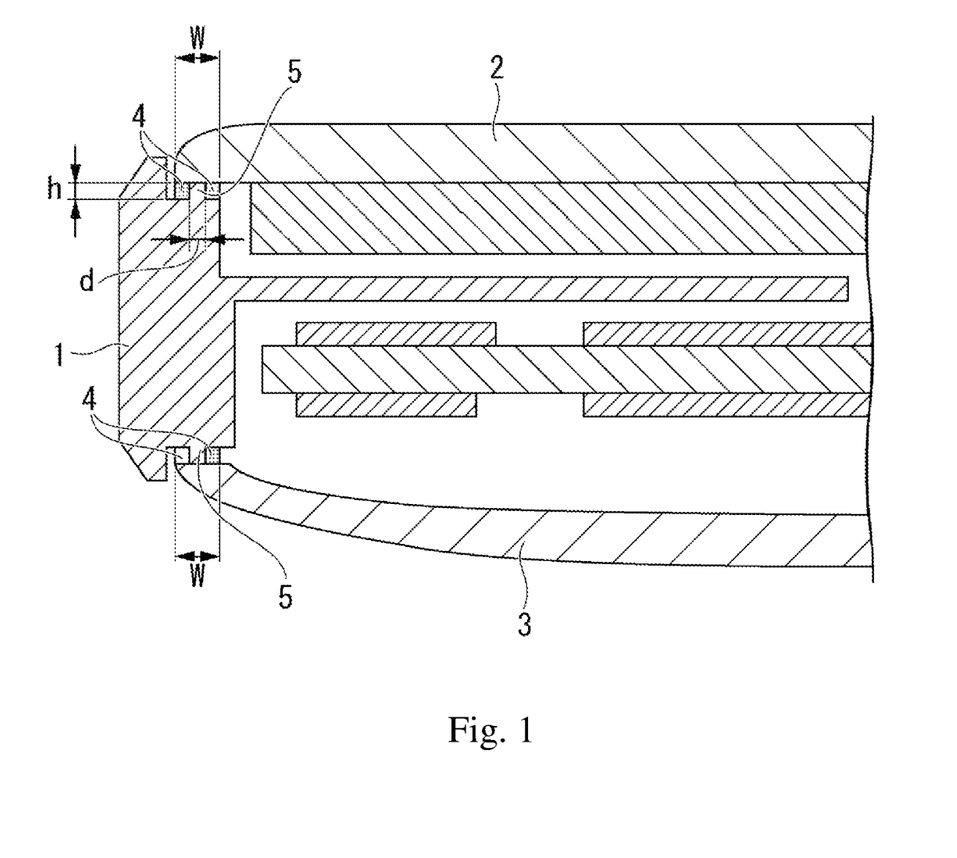
FIG. 1 shows a side view (a cross-sectional view) of a smart phone in a prior art.

FIG. 1 shows a side view (a cross-sectional view) of a smart phone in a prior art. A housing 1 and a touch panel 2 are adhered together by an adhesive 4. Spacers 5 are provided on an edge surface for adhesion. The housing 1 and a back cover 3 may be also adhered together by the adhesive 4. Spacers 5 may be also provided on an edge surface for adhesion. When pressure is applied to bond, the spacers 5 keep adequate thickness of an adhesive layer needed for adhesion, that is height h of the spacers 5. W is maximum width of the edge surface for adhesion, and d is width of the spacers 5. In a zone where the spacers 5 are not provided, width W contributes to adhesion. However, in a zone where the spacers 5 are provided, width W-d only contributes to adhesion. The spacers 5 reduce substantial adhesion width. The reduced width weakens adhesion strength and reliability of waterproof. The substantial adhesion width is needed to be widened to pass IPx7 test for reliability of waterproof. Moreover, the spacers 5 may cause stress to glass of the touch panel 2 and crack it in case the smart phone is dropped.

Figure 2:
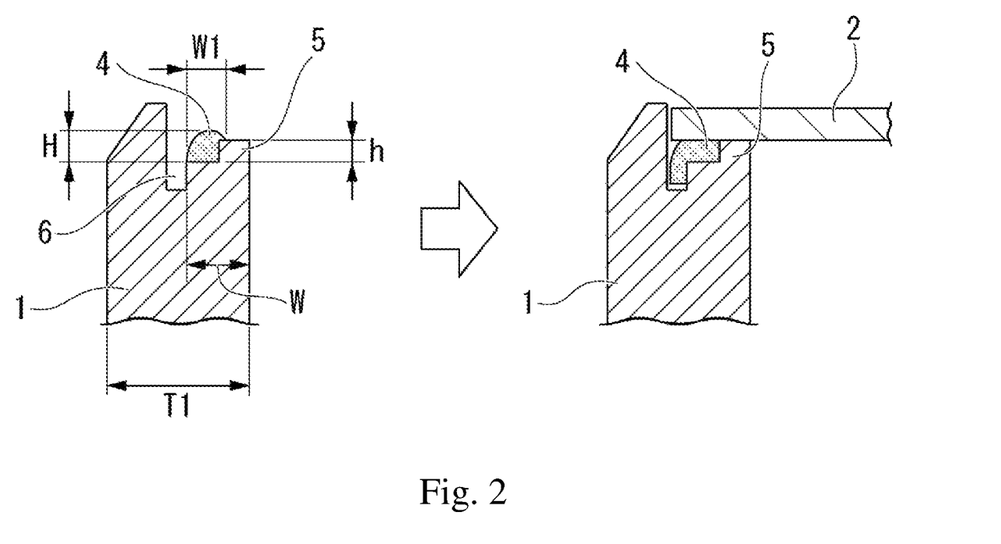
FIG. 2 shows a side view (a cross-sectional view) of a housing and a touch panel of a smart phone in another prior art.

Furthermore, when pressure is applied to bond, an excess adhesive may be squeezed outside the housing 1. FIG. 2 shows a side view (a cross-sectional view) of the housing 1 and the touch panel 2 of a smart phone in another prior art. In addition to the spacers 5, a channel 6 is also provided next to the edge surface for adhesion of the housing 1. Height H of dispensed adhesive is higher than height h of the spacers 5. Width W1 of dispensed adhesive is narrower than the maximum width W of the edge surface for adhesion. The squeezed adhesive flows into the channel 6 and does not flow outside the housing 1. However, thickness T1 of the housing 1 is thickened due to presence of the channel 6.

SUMMARY

According to an aspect of the present invention, a sealing method is provided, the sealing method including steps of: dispensing an adhesive on an edge surface of the first part; performing a first activation for hardening the adhesive to a predetermined hardness; performing a second activation for triggering appearance of adhesion strength of the adhesive; assembling the first part and the second part; and pressing the first part and the second part against each other.

According to the aspect, after performing a first activation for hardening the adhesive to a predetermined hardness, the first part and the second part are pressed against each other. Thus, an adhesive layer is not flattened without spacers, substantial adhesion width is wider than that in the prior art, and the entire width of the edge surface for adhesion can be minimized. Furthermore, the adhesive is not squeezed outside the first part without a channel, and thickness of the first part can be reduced.

In a possible implementation of the aspect, after the assembling the first part and the second part, the second activation is performed.

In a possible implementation of the aspect, the adhesive includes urethane-acrylic adhesive, epoxy adhesive, denatured silicone adhesive, denatured acrylate adhesive, UV curing adhesive, or UV and moisture curing adhesive.

In a possible implementation of the aspect, method for dispensing the adhesive includes air dispense method, jet dispenser method, screw pump method, or slit coating method.

In a possible implementation of the aspect, the first part is a housing, and the second part is a touch panel.

In a possible implementation of the aspect, the performing the first activation includes cooling the adhesive, shocking the adhesive, or giving moisture to the adhesive, and the performing the second activation includes irradiating ultraviolet (UV) light to the adhesive, giving moisture to the adhesive, or heating the adhesive.

In the possible implementation, ultraviolet (UV) light is irradiated to the adhesive before assembling the first part and the second part. Thus, the UV light can be irradiated to the adhesive even if the first part and the second part are not transparent.

In a possible implementation of the aspect, time required for performing the first activation for hardening the adhesive to the predetermined hardness is more than one minute, time required for assembling the first part and the second part is less than one minute, and time from performing the second activation for triggering appearance of adhesion strength of the adhesive to reaching predetermined adhesion strength of the adhesive is more than one hour.

In the possible implementation, even if the second activation for triggering appearance of adhesion strength of the adhesive is performed before assembling the first part and the second part, the adhesion strength of the adhesive is not spoiled.

In a possible implementation of the aspect, time from completion of the first activation to start of the second activation is free.

In the possible implementation, the assembling can be started at any desired point in time.

According to another aspect of the present invention, a terminal assembled by using the sealing method is provided.

DESCRIPTION OF EMBODIMENTS

Figure 3:
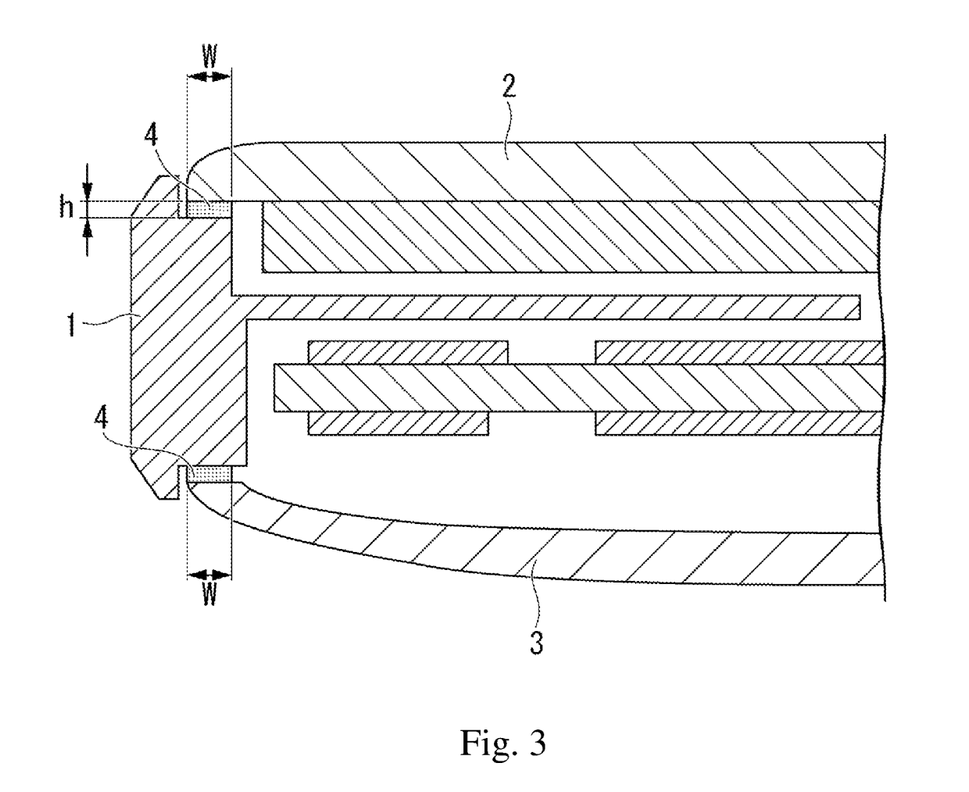
FIG. 3 shows a side view (a cross-sectional view) of a smart phone according to an embodiment of the present invention.

FIG. 3 shows a side view (a cross-sectional view) of a smart phone after assembly is completed according to an embodiment of the present invention. A housing 1 and a touch panel 2 are adhered together by an adhesive 4. The housing 1 and a back cover 3 is also adhered together by the adhesive 4. Spacers and a channel are not provided on an edge surface for adhesion of the housing 1. When pressure is applied to bond the housing 1, the touch panel 2, and the back cover 3, an adequate thickness h of an adhesive layer is kept without spacers, and the adhesive 4 is not squeezed outside the housing 1 without a channel, because the adhesive 4 is hardened to semi solid state before pressure is applied. W is the width of the edge surface for adhesion. The entire width W contributes to adhesion, that is, substantial adhesion width is wider than that in the prior art because of omitting the spacers or channel on the edge surface of the housing 1. The widened substantial adhesion width improves adhesion strength and reliability of waterproof. In other words, the entire width W of the edge surface for adhesion can be minimized while adhesion strength and reliability of waterproof are maintained, and narrow edge width with adhesion strength and reliability of waterproof is realized.

Figure 4:
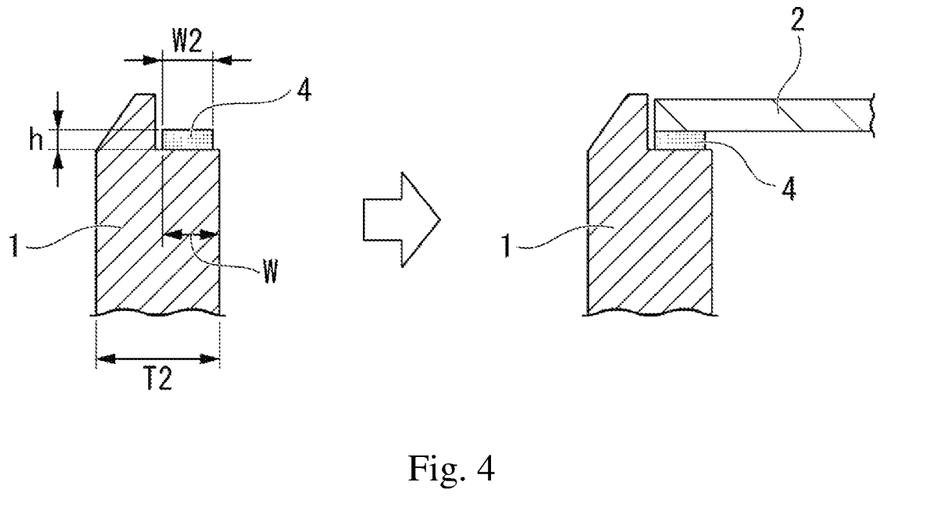
FIG. 4 shows a side view (a cross-sectional view) of a housing and a touch panel of a smart phone according to an embodiment of the present invention.

FIG. 4 shows a side view (a cross-sectional view) of the housing 1 and the touch panel 2 of a smart phone before and after assembly according to the embodiment of the present invention. Thickness h is the thickness of dispensed and hardened adhesive 4. Width W2 of dispensed and hardened adhesive 4 is narrower than width W of the edge surface for adhesion. After assembly and compression, the adhesive 4 is not flattened, and keeps an adequate thickness, because the adhesive 4 is hardened to semi solid state before compression.

Furthermore, thickness T2 of the housing 1 without a channel according to the present invention is thinner than thickness T1 of the housing 1 with the channel 6 in the prior art.

Material of the housing 1 is plastic, metal, and so on. Examples of the plastic include PBT, PPS, PC, PAEK, and so on. Examples of the metal include aluminum, stainless steel, magnesium, and so on.

Examples of the adhesive 4 include urethane-acrylic adhesive, epoxy adhesive, denatured silicone adhesive, denatured acrylate adhesive, UV curing adhesive, UV and moisture curing adhesive, and so on.

Examples of method for dispensing the adhesive 4 include air dispense method, jet dispenser method, screw pump method, slit coating method, and so on.

Figure 5:
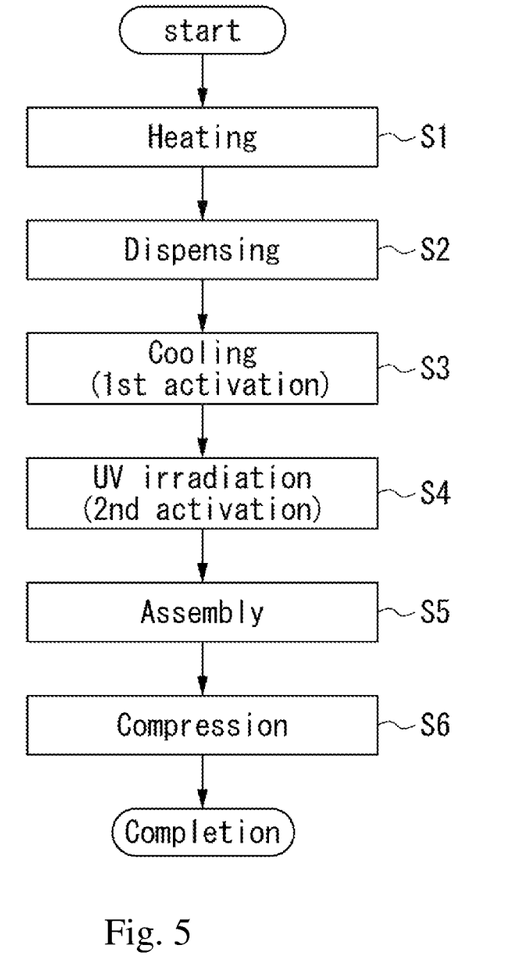
FIG. 5 shows a flow chart of a sealing method for sealing a boundary between a housing and a touch panel according to an embodiment of the present invention.
Figure 6:
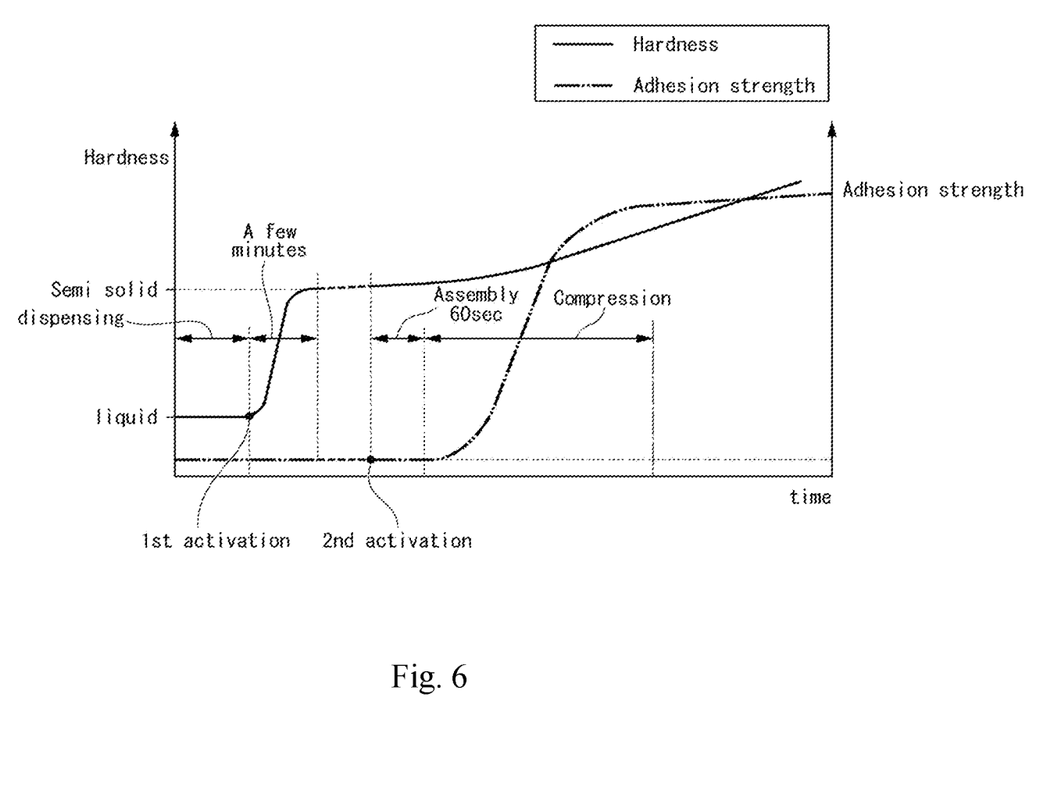
FIG. 6 shows a graph indicating transition with lapse of time in the process of hardness and adhesion strength of the adhesive.

FIG. 5 shows a flow chart indicating a process for assembling a housing 1 and a touch panel 2 of a smart phone according to an embodiment of the present invention. FIG. 6 shows a graph indicating transition with lapse of time (on horizontal axis) in the process of hardness (on left vertical axis) and adhesion strength (on right vertical axis) of the adhesive 4.

In step S1, if the adhesive 4 is not soft enough for the following dispensing, the adhesive 4 is heated. Otherwise, this step is not needed.

In step S2, the adhesive 4 is dispensed on an edge surface for adhesion of the housing 1.

In step S3 of a first activation, the adhesive 4 is cooled for a few minutes to harden the adhesive 4. The adhesive 4 is transformed from liquid state to semi solid state. In the first activation, appearance of adhesion strength of the adhesive 4 is not triggered yet.

In step S4 of a second activation, ultraviolet (UV) light is irradiated to the adhesive 4 to trigger appearance of adhesion strength of the adhesive 4, just before the following step 5 of assembly.

In step S5, the housing 1 and the touch panel 2 are assembled. Print may be applied on inside surface of the touch panel 2, that is, the touch panel 2 may not be transparent. Therefore, this step of assembly is performed after irradiating UV light to the adhesive 4 for trigger. Time required for assembly is about 30 to 60 seconds, for example. The adhesion strength of the adhesive 4 is low within this lapse of time. Thus, the adhesion strength is not spoiled.

One of the suitable method of second activation is irradiating UV light. In case of using a type of adhesive to which UV light is irradiated to trigger appearance of adhesion strength, the second activation should be performed before assembly. There exists such kind of adhesive. If other type of adhesive to which moisture is given or heat is applied for trigger is used, the second activation can be performed after assembly.

In step S6, the housing 1 and the touch panel 2 are pressed against each other to bond them together for about several hours to one day, for example. An adhesive layer keeps adequate thickness, since the adhesive 4 was hardened to semi solid state in the preceding step S3 of the first activation. The adhesion strength of the adhesive 4 gradually increases for this lapse of time. When the adhesion strength reaches sufficient adhesion strength which overcomes internal pressure, the process is completed.

Time from completion of step S3 of the first activation to start of step 4 of the second activation is free. Thus, step S5 of assembly can be started at any desired point in time.

Alternatively, the first activation includes shocking the adhesive 4 or giving moisture to the adhesive 4. The second activation includes giving moisture to the adhesive 4 or heating the adhesive 4.

The invention claimed is:

1. A sealing method for sealing a boundary between a first part and a second part, wherein the sealing method comprises:
dispensing an adhesive on an edge surface of the first part, wherein the first part is a housing, and wherein the adhesive comprises a denatured silicone adhesive or a denatured acrylate adhesive;
performing a first activation for hardening the adhesive to a predetermined hardness;
performing a second activation for triggering appearance of adhesion strength of the adhesive;
assembling the first part and the second part, wherein the second part is a touch panel; and
pressing the first part and the second part against each other.

2. The sealing method of claim 1, further comprising performing the second activation after assembling the first part and the second part.

3. The sealing method of claim 1, wherein the adhesive comprises urethane-acrylic adhesive.

4. The sealing method of claim 1, further comprising further dispensing the adhesive using an air dispensing method.

5. The sealing method of claim 1, wherein the first activation comprises cooling the adhesive, shocking the adhesive, or adding moisture to the adhesive.

6. The sealing method of claim 1, wherein a first time for performing the first activation is greater than one minute, wherein a second time for assembling the first part and the second part is less than one minute, and wherein a third time for performing the second activation to reach a predetermined adhesion strength of the adhesive is greater than one hour.

7. The sealing method of claim 1, wherein a time from a completion of the first activation to a start of the second activation does not comprise a limit.

8. The sealing method of claim 1, wherein the adhesive comprises an epoxy adhesive.

9. The sealing method of claim 1, wherein the adhesive comprises an ultraviolet (UV) curing adhesive.

10. The sealing method of claim 1, wherein the adhesive comprises an ultraviolet (UV) and moisture curing adhesive.

11. The sealing method of claim 1, further comprising further dispensing the adhesive using a jet dispenser method.

12. The sealing method of claim 1, further comprising further dispensing the adhesive using a screw pump method.

13. The sealing method of claim 1, further comprising further dispensing the adhesive using a slit coating method.

14. The sealing method of claim 1, further comprising further performing the second activation by irradiating ultraviolet (UV) light to the adhesive.

15. The sealing method of claim 1, further comprising further performing the second activation by adding moisture to the adhesive.

16. The sealing method of claim 1, further comprising further performing the second activation by heating the adhesive.

17. A terminal prepared by a processing comprising the steps of:
dispensing an adhesive on an edge surface of a first part, wherein the first part is a housing, and wherein the adhesive comprises a denatured silicone adhesive or a denatured acrylate adhesive;
performing a first activation for hardening the adhesive to a predetermined hardness;
performing a second activation for triggering appearance of adhesion strength of the adhesive;
assembling the first part and a second part, wherein the second part is a touch panel; and
pressing the first part and the second part against each other.

18. The terminal of claim 17, wherein the first activation comprises cooling the adhesive, shocking the adhesive, or adding moisture to the adhesive.

19. The terminal of claim 17, wherein the adhesive further comprises an epoxy adhesive, an ultraviolet (UV) curing adhesive, an ultraviolet (UV) and moisture curing adhesive, or urethane-acrylic adhesive.

* * * * *